April 13, 1926.
G. C. OAKES
1,580,156
PROCESS AND APPARATUS FOR ROLLING GLASS
Filed July 9, 1925         2 Sheets-Sheet 1
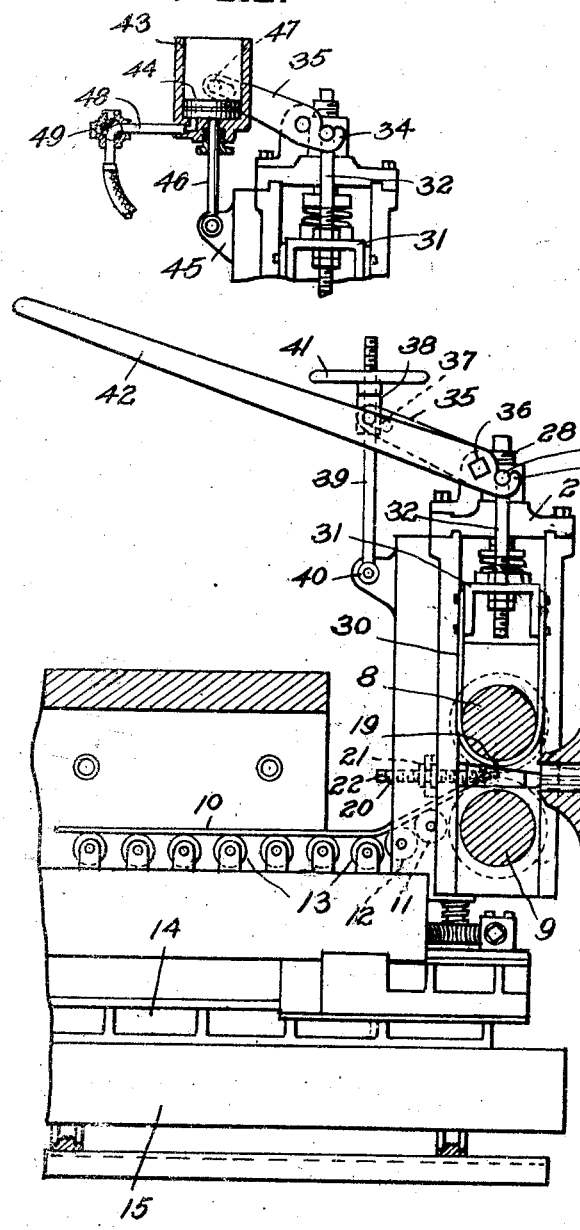
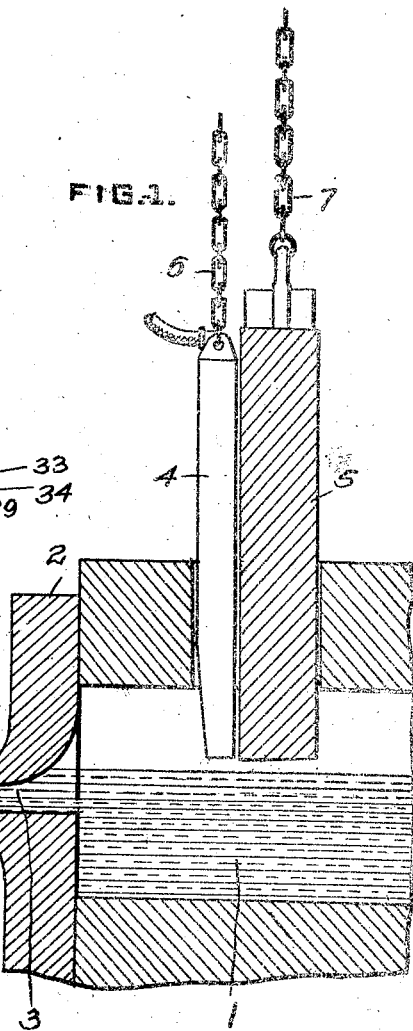
INVENTOR
Grover C. Oakes
by
James C. Bradley
atty.

April 13, 1926.

G. C. OAKES 1,580,156

PROCESS AND APPARATUS FOR ROLLING GLASS

Filed July 9, 1925

2 Sheets-Sheet 2

FIG. 2.

INVENTOR
Grover C. Oakes
by
James C. Bradley
atty.

Patented Apr. 13, 1926.

1,580,156

UNITED STATES PATENT OFFICE.

GROVER C. OAKES, OF CREIGHTON, PENNSYLVANIA, ASSIGNOR TO PITTSBURGH PLATE GLASS COMPANY, A CORPORATION OF PENNSYLVANIA.

PROCESS AND APPARATUS FOR ROLLING GLASS.

Application filed July 9, 1925. Serial No. 42,490.

*To all whom it may concern:*

Be it known that I, GROVER C. OAKES, a citizen of the United States, and a resident of Creighton, in the county of Allegheny and State of Pennsylvania, have made a new and useful invention in Improvements in a Process and Apparatus for Rolling Glass, of which the following is a specification.

The invention relates to a process and apparatus for rolling glass in a continuous ribbon or sheet as a step in the manufacture of plate glass. It has for its object, the provision of a procedure and construction whereby the quality of the glass produced is materially improved. In the process of rolling glass continuously from a tank, it has been found that after a period of operation, which varies considerably in length, bubbles, devitrified glass and other defects commence to show in the glass in increasing quantity. It is believed that this is due to the conditions which exist in the bath just back of the rolls, at which point the walls of the outlet slot through which the glass is passing tend to stop or retard the flow, and thus cause an accumulation of the bubbles which are scattered through the glass. Such bubbles may also be actually formed at this point, due to a reaction between the glass and the clay walls of the slot. Due also to the chilling effect of the outlet slot, and of the rolls themselves, a layer of relatively thick viscous glass is retained by such walls, and in the course of time, this glass becomes devitrified. This glass is finally carried through the rolls and shows as cloudy streaks or bands.

I have found that this unfavorable condition may be overcome and glass of high quality produced, even after a long period of operation, by a procedure which has been aptly described as "flushing" the rolls. This is accomplished by periodically separating the rolls for short periods, during which periods, the glass flows through the roll pass in a thick stream carrying with it any accumulation of bubbles and also washing away any layer of more viscous glass which may have been accumulating along the clay surfaces just back of the rolls. This flushing operation may be carried out every hour or two (the exact period depending on conditions) and ordinarily the rolls will be separated about one half inch and held in this position while a body of glass from eight to twelve inches long flows through, the width of the opening and the length of the period also depending on conditions. The thickened sections of glass thus formed contain the major portion of any bubbles and chilled glass (either devitrified or on the way to become such) which would eventually enter into and be scattered through the ribbon if not collected in this manner, and such sections are cut from the ribbon as waste glass after it emerges from the leer through which it is conducted from the rolls. A wide variety of mechanism may be provided for carrying out this flushing step, and in fact, no particular means need be provided, as it is always possible to move one of a pair of sizing rolls away from the other. It is desirable, however, to provide an arrangement whereby the periodic flushing may be accomplished by the attendants easily and conveniently, and without any requirement for resetting of the movable roll after the operation is completed, and two forms of mechanism, as designed for this purpose, are illustrated in the accompanying drawings, wherein:

Figure 1 is a vertical section on the line I—I—I—I of Fig. 2. Fig. 2 is a partial front elevation and partial vertical section. And Fig. 3 is a partial side elevation showing a modification.

Referring to the drawings, 1 is the forward or outlet end of a melting tank, preferably of the regenerator type and provided with a front wall 2 having an outlet slot 3. The outlet end of the tank may be cut off from the rest of the tank by means of the gates 4 and 5 supported from above upon a crane by means of the depending chains 6 and 7, the gate 4 being of metal and water cooled and the gate 5 being of refractory material such as clay.

Forward of the outlet slot 3 are a pair of forming or sizing rolls 8 and 9, preferably driven and water cooled and adapted to form the molten glass into a ribbon 10 which is received upon a runway made up of the series of rolls 11, 12, 13, etc. These rolls and also the rolls 8 and 9 are carried upon a suitable framework 14 mounted upon the carriage 15, such carriage being adapted to be moved laterally from its position in front of the tank to a position at one side thereof. Forward of the roller runway is a leer, not shown, which receives the sheet or ribbon 10 and takes care of the annealing and gradual cooling of such sheet, the glass being cut into sections at the far end of the leer.

The rolls 8 and 9 are journaled at their ends in the bearing blocks 16 and 17, which bearing blocks are suitably guided and supported in the standards 18 carried by the framework 14. Intermediate the bearing blocks 16 and 17 at each end of the rolls is a roll spacing wedge 19 which has threaded into its end the operating screw 20. This screw is swiveled in the standard 18 as indicated at 21 (Fig. 1), and the outer end of the screw is provided with a square end 22 for receiving a wrench or other suitable handle for rotating the screw. By this means, the distance between the rolls may be regulated to give the desired thickness of sheet and to maintain the rolls in parallelism. The rolls are provided with swivels at their ends, to which are connected the water pipes 23 and 24 for giving a circulation of water, and the driving of the rolls is accomplished by means of the tumbler shafts 25 and 26 (Fig. 2) connected to suitable driving means, not shown.

The upper roll 8 is yieldingly held in position by means of a spring 27 at each end bearing against the blocks 16 and having its pressure regulated by means of the screws 28 extending through the blocks 29 bolted to the upper ends of the standards 18, as indica'd in Fig. 1. At each end of the roll 8 a stirrup 30 is provided encircling the end of the roll just outside the bearing block 16, the upper end of each stirrup being bolted to a U shaped block 31 through which extends a threaded pull rod 32. Each pull rod is provided at its upper end with a head 33, which is engaged by the hook end 34 of a lever having the long arm 35. This lever is mounted near one end of the square shaft 36, such shaft being journaled in brackets bolted to the cap plates 29 of the standards 18. The long end 35 of the lever is made in the form of a fork having the slots 37 and between these ends is mounted a sleeve 38 provided with a pair of laterally extending pins lying in such slots. This sleeve telescopes loosely over the threaded rod 39 pivoted at its lower end to the bracket 40 and is adapted to be moved down by means of a hand wheel 41 having threaded engagement with the rod. By the use of this hand wheel, the lever may be operated to lift the roll 8 against the pressure of the spring 27 and thus permit the passage between the rolls of a relatively thick layer of glass, as heretofore referred to.

Provision is also made for accomplishing this same function by the use of either one or both of the levers 42 and 42ª which are mounted upon the ends of the square shaft 36. The leverage is such that an operator at either end of the rolls can easily raise the roll 8 to permit the flushing action by grasping the end of the lever 42 or the end of the lever 42ª and pulling such lever down so as to raise the roll 8 the desired distance.

The distance which the roll 8 is lifted to give the desired flushing effect, and the time which such roll is maintained in lifted position will vary depending upon conditions. Ordinarily, if a ribbon ⅜" in thickness is being rolled, the distance which the roll 8 will be raised for flushing is about ⅜" more, so that a layer of glass ¾" in thickness will pass between the rolls as long as they are kept in separated position. The rolls will ordinarily be kept separated this increased distance to permit a layer of glass about 12" long to pass therethrough. It has also been found desirable, although not necessary, to repeat the flushing action several times at short intervals and then allow the rolls to operate in the usual way for about 2 hours. This is merely by way of illustration, as the desired result involved in getting rid of any accumulated bubbles or viscous glass clinging to the lips of the outlet slot may be accomplished by timing the flushing operations and prolonging them in a wide variety of ways. When the operating levers are released to permit the roll 8 to move back to its original position, the spacing apart of the rolls remains the same as before the flushing operation, due to the use of the wedges 19 which limit the downward movement of the upper roll. The weight of the roll 8 in conjunction with the springs 27 insure that the upper roll will be pressed down with such firmness that its ends engage the wedges 19 so that the thickness of the sheet produced is not affected by the stiffness of the glass passing therebetween.

Fig. 3 illustrates another method of actuating the lever arm 35 in place of the hand wheel 41. This means includes a cylinder 43 and a piston 44, the latter of which is connected to the bracket 45 by means of the rod 46. The forked end of the arm 35 straddles the cylinder and is engaged by a pair of pivots 47 projecting laterally from the cylinder walls. The lower end of the cylinder below the piston is supplied with fluid under pressure, such as air or water by means of a pipe 48 provided with a three way valve 49. Upon admitting fluid under pressure through the pipe 48, the cylinder 43 is moved down to lower the arm 35 and thus raise the roll which is supported from the hook end 34 of the lever. The roll is lowered after the flushing operation by moving the three way valve 49 to exhaust position, so that the fluid in the cylinder beneath the piston is allowed to escape. A wide variety of mechanism might be employed for moving the upper roll 8 to flushing position, the invention, in so far as the method of operation is concerned, not being limited to the use of any particular form of mechanism.

What I claim is:

1. A process for making plate glass which consists in flowing it continuously from a body of molten glass between a pair of driven sizing rolls, and periodically separating the rolls to permit a body of glass to pass therethrough of a thickness in excess of that of the ribbon which is being produced.

2. A process for making plate glass which consists in flowing it continuously from a body of molten glass under the head pressure thereof between a pair of sizing rolls set to produce a ribbon or sheet of a definite thickness, and periodically separating the rolls for short intervals to permit the passage of sections of glass which are much thicker than the normal thickness of the sheet or ribbon.

3. In combination in apparatus for making plate glass, a tank containing a body of molten glass, and having an outlet leading through the wall of the tank, a pair of sizing rolls in opposition to said outlet, yielding means arranged to apply pressure to one of the rolls and tending to maintain the pass between the rolls of a constant width, and power means for separating the rolls against the pressure of said yielding means to permit the passage therethrough of a body of glass of a thickness greater than that of the ribbon or sheet which is being produced.

4. In combination in apparatus for making plate glass, a tank containing a body of molten glass, and having an outlet leading through the wall of the tank, a pair of sizing rolls in opposition to said outlet, spring means for applying pressure to one of the rolls to press it toward the other roll, means for adjusting the pressure of said spring means, and lever means for moving the spring pressed roll away from the other roll against the pressure of said spring means to widen the pass between the rolls.

5. In combination in apparatus for making plate glass, a tank containing a body of molten glass, and having an outlet leading through the wall of the tank, a pair of sizing rolls in opposition to said outlet, spring means for applying pressure to one of the rolls to press it toward the other roll, means for adjusting the pressure of said spring means, adjustable stop means for limiting the movement of the spring pressed roll toward the other roll, and lever means for moving the spring pressed roll away from the other roll against the pressure of said spring means to widen the pass between the rolls.

In testimony whereof, I have hereunto subscribed my name this 2nd day of July, 1925.

GROVER C. OAKES.